United States Patent [19]

Wiggins et al.

[11] Patent Number: 5,065,721

[45] Date of Patent: Nov. 19, 1991

[54] POWER SUPPLY CIRCUIT FOR DUAL THROTTLE POSITION SENSORS OF AN ELECTRONIC ENGINE THROTTLE CONTROL

[75] Inventors: Kregg S. Wiggins, Clarkston, Mich.; Danny O. Wright, Grafton, Va.

[73] Assignee: Siemens Automotive L.P., Auburn Hills, Mich.

[21] Appl. No.: 501,078

[22] Filed: Mar. 28, 1990

[51] Int. Cl.[5] ...................... F02B 77/08; F02D 41/22; G01M 19/00

[52] U.S. Cl. .................................. 123/399; 123/479; 73/118.1

[58] Field of Search ................ 123/399, 479; 73/118.1

[56] References Cited

U.S. PATENT DOCUMENTS

| | | | |
|---|---|---|---|
| 4,515,009 | 5/1985 | Hasegawa et al. | 73/118.1 |
| 4,612,615 | 9/1986 | Murakami | 123/399 |
| 4,679,440 | 7/1987 | Okamura | 73/118.1 |
| 4,850,319 | 7/1989 | Imoehl | 123/361 |
| 4,920,939 | 5/1990 | Gale | 123/479 |

*Primary Examiner*—Tony M. Argenbright
*Assistant Examiner*—Robert E. Mates
*Attorney, Agent, or Firm*—George L. Boller; Russel C. Wells

[57] ABSTRACT

Rather than having the two throttle position sensors connected directly to a common D.C. power supply, isoation circuits are connected between each sensor and the power supply so that a short in one sensor will be indicated to the ECU without adversely affecting the signal from the other sensor. The isolation circuits are simple RC circuits.

12 Claims, 1 Drawing Sheet

POWER SUPPLY CIRCUIT FOR DUAL THROTTLE POSITION SENSORS OF AN ELECTRONIC ENGINE THROTTLE CONTROL

FIELD OF THE INVENTION

This invention relates to an electronic throttle control for an internal combustion engine, particularly to a control containing two throttle position sensors.

BACKGROUND AND SUMMARY OF THE INVENTION

Commonly assigned U.S. Pat. No. 4,850,319 describes an Electronic Throttle Actuator for an internal combustion engine. One of the features of that patent is the inclusion of redundant torsion springs for biasing the throttle mechanism toward idle position so that each spring is capable by itself of returning the throttle mechanism to idle.

Since a throttle position sensor is another important component of an electronic engine throttle control, its replication in the system may also be desirable. For example, if two throttle position sensors that have substantially identical electrical characteristics are coupled in substantially the same manner with the throttle mechanism, they should at all times give substantially identical electrical signals so that a discrepancy between signals will indicate a need to inspect the system for the cause or causes of the discrepancy.

The present invention has been made in consequence of the applicants' recognition that correspondence between the throttle position sensors' signals is not in all circumstances necessarily a complete guarantee that both are providing signals that are true of current throttle position. For example, the occurrence of certain forms of short circuits in one of the two sensors will load down the power supply to the sensors in such a way that each sensor will give about the same signal as the other, but neither signal will correctly represent throttle position.

The present invention provides means to avoid the occurrence of such a situation. In the disclosed embodiment of the invention, both throttle position sensors are electrically energized from a common power supply, but an isolation circuit is provided between each sensor and the common power supply such that the occurrence of a short in one of the two sensors that would otherwise cause the sensors to give substantially identical, but inaccurate, signals will cause a discrepancy between the signals indicative of a need to investigate the cause or causes of the discrepancy. In this way, it becomes possible to promptly initiate corrective action toward identifying and replacing a shorted sensor. Advantageously, the isolation circuits can be of quite simple form, RC circuits being very satisfactory.

The foregoing features, along with further advantages and benefits of the invention, will be seen in the ensuing description and claims, which are accompanied by a drawing. The drawing illustrates a presently preferred embodiment of the invention according to the best mode contemplated at this time for putting the invention into practice.

DESCRIPTION OF THE PREFERRED EMBODIMENT

Figure 1:
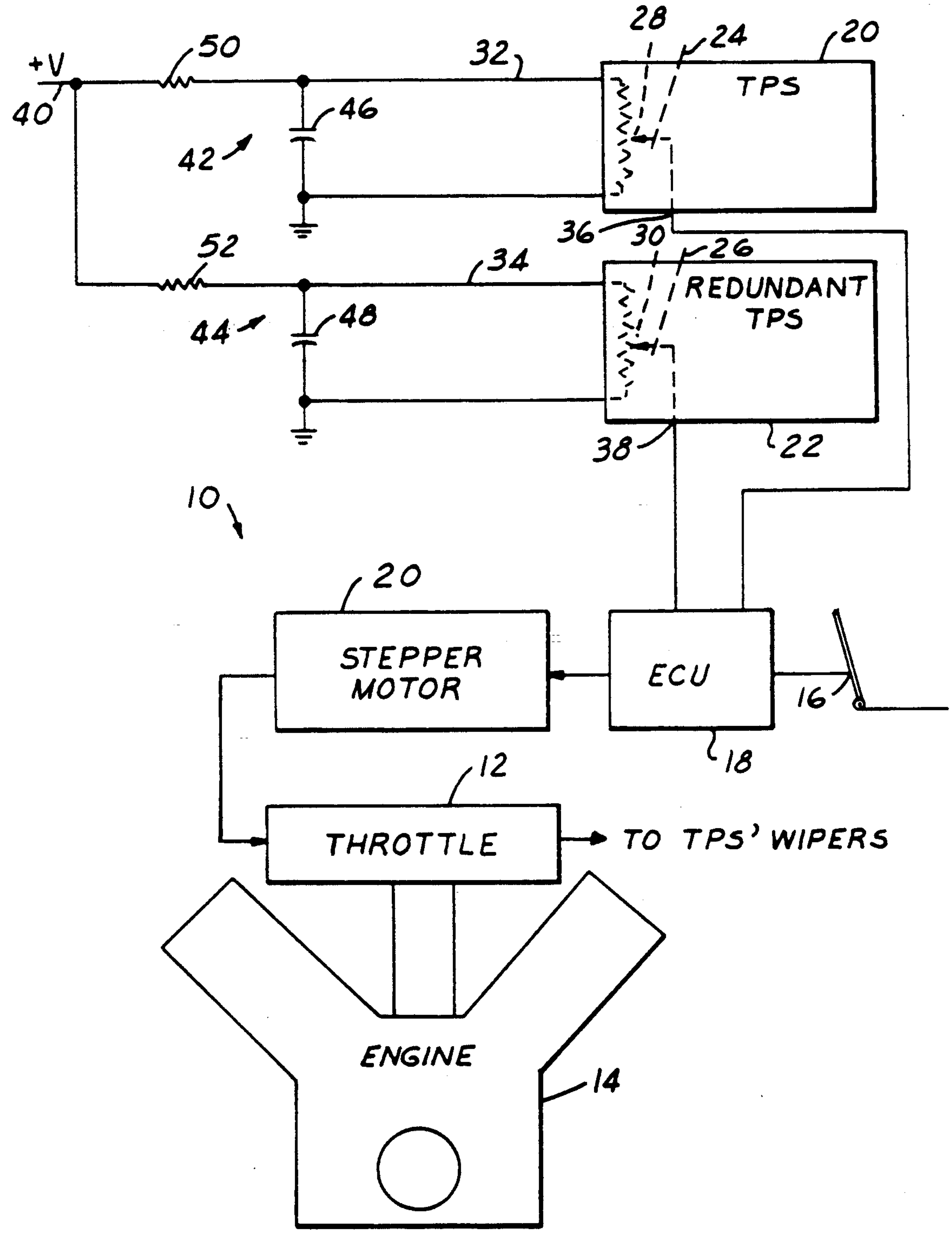
FIG. 1 is a schematic diagram of the presently preferred embodiment.

The drawing presents an electronic throttle control 10 controlling the throttle 12 of an internal combustion engine 14 in an automobile. Operator commands are issued to an ECU (electronic control unit) 18 from a foot pedal operated device 16, such as that described in commonly assigned U.S. Pat. No. 4,869,220. In turn ECU 18 operates an actuator 20, preferably a stepper motor, that operates the mechanism of throttle 12 to a position correlated with the pedal position of device 16. As the pedal position changes, so does the position of the throttle mechanism, and in this way the operator of the automobile exercises control over engine 14.

Closed loop control over the positioning of the mechanism of throttle 12, such as that described in commonly assigned U.S. Pat. No. 4,855,660, mandates that a throttle position sensing means be associated with throttle 12 to provide position feedback to ECU 18. To this end, control 10 utilizes two sensors, namely a throttle position sensor (TPS) 20 and a redundant throttle position sensor (redundant TPS) 22, each having a corresponding input 24, 26 coupled with the mechanism of throttle 12 by any suitable coupling means, such as a direct mechanical coupling to a rotary shaft of the throttle. Potentiometers are typical devices used for sensing throttle position, and therefore each input 24, 26 is portrayed to operate a corresponding wiper 28, 30 to select a corresponding percentage of a corresponding reference voltage that is delivered at a corresponding electrical input 32, 34, and to present the selected percentage voltage at a corresponding electrical output 36, 38.

If the two sensors have identical characteristics, are coupled in like manner with the throttle shaft, and receive the same input voltage, they should provide substantially identical output signals to ECU 18. Failure to do so is detected by ECU 18 and the operator is alerted by a suitable indicating means (not shown). ECU 18 is designed in an appropriate fashion to handle such situations.

Rather than connecting the sensor inputs 32 and 34 directly to a common source of electrical potential 40, each is instead coupled with that source through a corresponding isolation circuit 42, 44. The two circuits 42 and 44 are identical, comprising capacitors 46, 48 and resistors 50, 52 connected to form RC circuits in which the voltage across each capacitor is presented to the corresponding sensor, and each capacitor is charged through the corresponding resistor. Now, if the occurrence of a short in either one of the two sensors causes a change in that sensor's output signal, the other sensor's output signal will not be affected whereby the two sensor's outputs will lose correspondence, a condition that can be detected by ECU 18 for indicating the need to investigate the source of the discrepancy. ECU 18 is programmed to handle such a discrepancy situation according to an appropriate procedure. Thus, the invention constitutes a useful improvement for an electronic throttle control.

While a presently preferred embodiment of the invention has been illustrated and described, principles of the invention may be practiced in other equivalent embodiments defined by the following claims.

We claim:

1. In an internal combustion engine for powering an automotive vehicle and comprising an electronic throttle control wherein engine's throttle mechanism is operated by an electric powered actuator which is under the control of an ECU, and associated with throttle mechanism are two throttle position sensors both supplying current throttle position information that is used by the ECU in exercising control over the actuator, such information being in the form of respective electrical signals from the two throttle position sensors, which signals are derived from a common source of electrical potential, the improvement which comprises means for enabling the ECU to promptly detect the occurrence of a short circuit type failure in one of said throttle position sensors without such short cirtuic type failure adversely affecting the signal from the other of said throttle position sensors.

2. The improvement set forth in cliam 1 in which said means comprises a first RC circuit between said one throttle position sensor and said source of electrical potential and a second RC circuit between said other throttle position sensor and said source of electrical potential.

3. The improvement set forth in claim 2 in which both said RC circuits are substantially identical with each other.

4. In an internal combustion engine for powering an automotive vehicle and comprising an electronic throttle control system wherein engine's throttle mechanism is operated by an electric powered actuator which is under the control of an ECU, and associated with the electronic throttle control system are two position sensors both associated with a shaft in the system and both supplying current shaft position information that is used by the ECU in exercising control over the actuator, such information being in the form of respective electrical signals from the two position sensors, which signals are derived from a common source of electrical potential, the improvement which comprises means for enabling the ECU to promptly detect the occurrence of a short circuit type failure in one of said position sensors without such short circuit type failure adversely affecting the signal from the other of said position sensors.

5. The improvement set forth in claim 4 in which said means comprises a first RC circuit between said one position sensor and said source of electrical potential and a second RC circuit between said other position sensor and said source of electrical potential.

6. The improvement set forth in claim 5 in which both said RC circuits are substantially identical with each other.

7. The improvement set forth in cliam 1 in which said electric powered actuator comprises a stepper motor.

8. The improvement set forth in claim 7 in which said means comprises a first RC circuit between said one throttle position sensor and said source of electrical potential and a second RC circuit between said other throttle position sensor and said source of electrical potential.

9. The improvement set forth in claim 8 in which both said RC circuits are substantially identical with each other.

10. The improvement set forth in claim 4 in which said electric powered actuator comprises a stepper motor.

11. The improvement set forth in claim 10 in which said means comprises a first RC circuit between said one position sensor and said source of electrical potential and a second RC circuit between said other position sensor and said source of electrical potential.

12. The improvement set forth in claim 11 in which both said RC circuits are substantially identical with each other.

* * * * *